March 10, 1936.  R. TAYLOR ET AL  2,033,361

DRIVING CHAIN JOINT AND METHOD OF MAKING SAME

Filed June 20, 1934

INVENTORS.
Reginald Taylor & John Knights
BY
ATTORNEY

Patented Mar. 10, 1936

2,033,361

UNITED STATES PATENT OFFICE 2,033,361

DRIVING CHAIN JOINT AND METHOD OF MAKING SAME

Reginald Taylor, Didsbury, and John Knights Byrom, Levenshulme, Manchester, England, assignors to The Renold and Coventry Chain Company Limited, Didsbury, Manchester, England, a British company Application June 20, 1934, Serial No. 731,536
In Great Britain July 29, 1933

6 Claims. (Cl. 29—148)

This invention relates to rivets, cotter pins or pivot pins of the kind which are secured in place by riveting. The invention is particularly applicable to the securing of the side-plates of jointed link chains to the jointing pins, but it is capable of advantageous use in rivets or pins generally.

According to the present invention the rivet or the like is provided with a transverse hole wholly or in part situated in that portion which projects beyond the face of the member to be secured. Endwise force or an endwise blow on the projecting end will cause the metal to bulge outwardly in a direction transverse to the length of the hole, the hole itself being flattened and closed or nearly closed. Further, the desired amount of bulge is obtained with considerably less endwise pressure or endwise blow than is required with a plain rivet or pin.

Preferably, the transverse hole, while being for the most part exposed beyond the face referred to above, extends slightly within that face. This ensures that the greatest lateral spreading shall occur at the face instead of some distance beyond it. The hole may, however, be tangential with the face or even spaced away from it by a slight amount.

Referring to the accompanying drawing.

Figure 1:
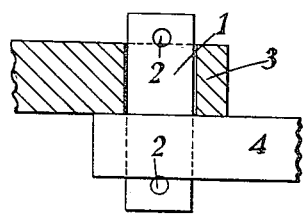
Figure 1 is a sectional elevation of a rivet according to this invention.
Figure 2:
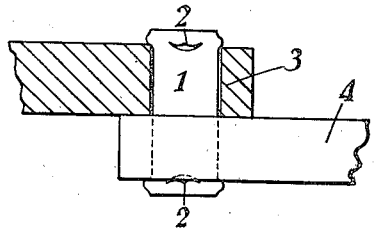
Figure 2 is a similar view showing the rivet closed.

Referring first to Figures 1 and 2 which illustrate the riveting together of two plates according to this invention, the rivet 1 is a round rod provided near each end with a transverse hole 2 and these holes are so situated that they extend slightly below the outer surfaces of the two metal plates 3 and 4. Endwise pressure applied to the rivet produces the effect shown in Figure 2, the extremities of the rod being compressed, the holes 2 are caused to collapse and the metal is spread laterally to close the rivet. It will be evident that a headed rivet might be used instead, there being only one hole 2 at the plain end.

Figure 3:
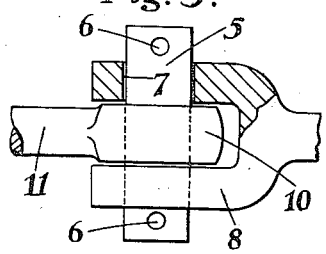
Figures 3 and 4 are views similar to Figures 1 and 2 showing the securing of a pivot pin in a fork.
Figure 4:
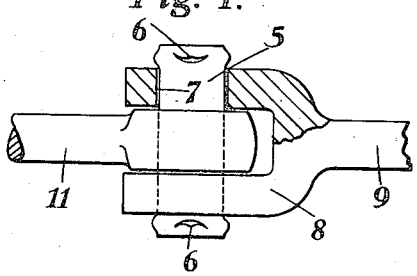

In Figures 3 and 4 a pivot pin 5 is provided with transverse holes 6, one near each end, and is threaded through holes 7 in a fork 8 at the end of a rod 9 and also through an eye 10 at the end of another rod 11, the whole constituting a knuckle joint. Endwise pressure on the pivot pin will cause the metal at its ends to expand as shown in Figure 4. It will be noticed that as illustrated the holes 6 are well outside the external surfaces of the fork 6 with the result that the expanded part of the pivot pin is external to the holes 7, whereas in the arrangement shown in Figures 1 and 2 some expansion takes place within the holes in the plates 3, 4. In some cases similar to that shown in Figures 3 and 4 it may be desired to secure the pivot pin against rotation in the holes 7 and in this case an arrangement similar to Figure 1 is employed.

Figure 5:
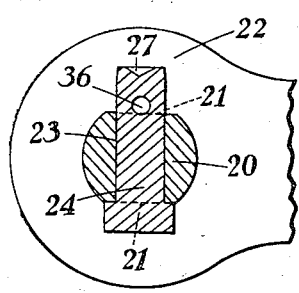
Figure 5 is a sectional elevation of a cotter pin according to this invention.
Figure 6:
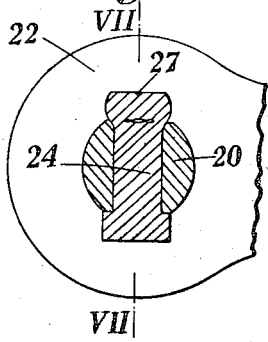
Figure 6 is a similar view showing the cotter pin after it is secured.
Figure 7:
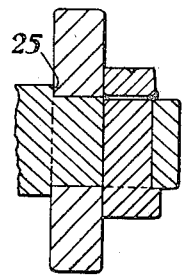
Figure 7 is a sectional end elevation along the line VII—VII in Figure 6.

Referring first to Figures 5, 6 and 7 these figures illustrate the application of the invention to the fastening of side plates to jointing pins of driving chains of large size. In chains of this character the ends of the jointing pins 20 are provided with oppositely-disposed flats 21 and the holes in the side plates 22 are made of corresponding shape. A cylindrical hole 23 is drilled through the end of the jointing pin which projects beyond the side plate and this hole is tangent to the outer face of the side plate as shown in Figure 7. A headed cotter pin 24 extends through this hole the head being provided with a flat fitting against the side plate, see Figure 7. Hitherto the other end of this cotter pin has been merely riveted over, spreading of the metal in all directions not only preventing the cotter pin being withdrawn but also forcing the side plate firmly against the shoulders 25 between the flats and the cylindrical portion of the jointing pin. According to the present invention the projecting end of the cotter pin has a hole 36 drilled through it the diameter of which is about one-third of the diameter of the cotter pin itself. This hole extends at right angles to the side plate and a small part of its circumference is within the hole 23 through which the cotter pin extends, that is to say, the plane of the flat 21 intersects the hole 36 as shown in Figure 5.

When the cotter pin is riveted by means of a press those portions of it on either side of the transverse hole 36 tend to bulge outwards and if sufficient pressure is applied the hole can be almost completely flattened as shown in Figure 6. The result is that with a given endwise pressure much greater lateral spreading immediately above the flat 21 is obtained than is possible when an unperforated cotter pin is used. Preferably, the hole 23 is countersunk, this countersink being completely filled by the laterally spread metal. Sufficient spread occurs in the direction transverse to the side plate to ensure that the side plate will be forced against the shoulders 25 of the jointing pin. It will be appreciated that owing to the fact that the hole 26 extends a little inside the plane of the flat 21 any trace of the hole which might be visible after it has been flattened will be within the countersink and therefore not conspicuous.

Although the hole 36 has been shown cylindrical it may if desired be of any other shape and there may be more than one hole, for example two holes may be drilled side by side or intersecting one another.

The cotter pin is preferably provided with a taper depression 27 at its extremity to assist the spreading action, and although this taper depression largely disappears when the rivet is closed enough of it remains to provide a centre for a punch employed in punching out the rivet when this operation becomes necessary. During this operation the bulged or overhanging parts of the rivet are sheared off.

Although in the particular example illustrated the hole 36 extends inside the surface 21 it may be tangential with that surface or even spaced away from it by a slight amount, although the ends of the flattened hole will then be visible.

We claim:—

1. A method of securing a pin within a hole consisting in providing the pin with a transverse hole situated at least partly in that portion of the pin which is to project beyond the face of the member in which the pin is to be secured, and applying endwise force to the pin to cause the metal surrounding the transverse hole to be spread outwardly in a direction transverse to the length of the transverse hole and to the length of the pin whereby the said metal forms an external rivet head.

2. The invention of claim 1 in which the pin is formed with a transverse hole at each end whereby the endwise force applied to the pin causes external rivet heads to be formed at each end of the pin.

3. In combination, a member having an aperture, a member extending therein formed with a transverse hole situated at least partly in that portion thereof which is external to the member first mentioned, said transverse hole forming a weakened portion, the second mentioned member being compressed longitudinally to bulge the weakened portion laterally to form an external rivet head.

4. In combination a forked member, having apertures through the limbs thereof, a rod having an apertured end situated between the limbs of the forked member, a pivot pin extending through the apertures in the limbs of the forked member and in the rod, each end of said pin being formed with a transverse hole forming a weakened portion, said transverse hole being in each case situated at least partly in that portion of the pin which is external to the adjacent limb of the forked member, said pin being compressed longitudinally to bulge the weakened portions laterally to form external rivet heads at each end thereof.

5. In a driving chain, in combination, a jointing pin having a shouldered end extending beyond the outer face of the sideplate of the chain and formed with a transverse hole tangential to said face and a headed cotter pin located in said hole and formed with a transverse hole situated at least partly in that portion of the cotter pin which projects beyond the side of the jointing pin, said cotter pin being compressed longitudinally to bulge laterally the parts of the cotter pin on either side of the transverse hole so as to form an external rivet head.

6. The invention of claim 5 wherein a small part of the circumference of the transverse hole in the cotter pin lies within the hole in which the cotter pin is situated whereby the longitudinally collapsed transverse hole lies substantially wholly beneath the external surface of the jointing pin.

REGINALD TAYLOR.
JOHN KNIGHTS BYROM.